United States Patent
Lanham et al.

(10) Patent No.: US 7,600,813 B2
(45) Date of Patent: Oct. 13, 2009

(54) TEMPORARY PROTECTIVE SEAT COVER

(75) Inventors: Larry L. Lanham, Naples, FL (US); Terry W. Orr, Cincinnati, OH (US); John P. Heaton, Uniontown, OH (US)

(73) Assignee: Polymer Packaging, Inc., Massillon, OH (US)

( * ) Notice: Subject to any disclaimer, the term of this patent is extended or adjusted under 35 U.S.C. 154(b) by 0 days.

(21) Appl. No.: 11/642,999

(22) Filed: Dec. 19, 2006

(65) Prior Publication Data

US 2007/0170757 A1     Jul. 26, 2007

Related U.S. Application Data

(60) Provisional application No. 60/751,756, filed on Dec. 19, 2005, provisional application No. 60/810,270, filed on Jun. 2, 2006.

(51) Int. Cl.
*A47C 31/00* (2006.01)

(52) U.S. Cl. .................. 297/229; 297/219.1; 297/228.1

(58) Field of Classification Search .............. 297/219.1, 297/223, 229, 228.1, 220

See application file for complete search history.

(56) References Cited

U.S. PATENT DOCUMENTS

| | | | |
|---|---|---|---|
| 3,517,693 A * | 6/1970 | Dietz | 137/557 |
| 3,517,963 A * | 6/1970 | Woods et al. | 297/228 |
| 3,692,618 A | 9/1972 | Dorschner | |
| 3,802,817 A | 4/1974 | Matsuki | |
| 3,849,241 A | 11/1974 | Buntin | |
| 4,340,563 A | 7/1982 | Appel | |
| 4,676,376 A | 6/1987 | Keiswetter | |
| 4,892,769 A * | 1/1990 | Perdelwitz et al. | 428/68 |
| 5,005,901 A | 4/1991 | Hinde | |
| 5,330,250 A * | 7/1994 | Reyes | 297/229 |
| 5,641,204 A | 6/1997 | Lhuissier | |
| 5,709,431 A * | 1/1998 | Horn | 297/228.1 |
| 6,050,639 A * | 4/2000 | Horn | 297/229 |
| 6,106,956 A | 8/2000 | Heyn | |
| 6,655,734 B2 * | 12/2003 | Hunter et al. | 297/219.1 |
| 6,655,735 B1 * | 12/2003 | Learning | 297/228.1 |
| 6,722,733 B2 * | 4/2004 | Schmidt et al. | 297/229 |
| 6,951,368 B2 * | 10/2005 | Self | 297/229 |
| 7,162,746 B2 * | 1/2007 | Reynolds | 2/87 |
| 7,469,962 B2 * | 12/2008 | Paulin | 297/229 |
| 2003/0136949 A1 | 7/2003 | Danielson | |
| 2003/0155796 A1 | 8/2003 | DePaulis | |

(Continued)

OTHER PUBLICATIONS

Slip N Grip® Seat Covers, undated, but printed on Jan. 25, 2007 from www.petoskeyplastics.com.

(Continued)

*Primary Examiner*—Sarah B McPartlin
(74) *Attorney, Agent, or Firm*—Zollinger & Burleson Ltd.

(57) ABSTRACT

A seat cover adapted to removably cover a seat in an automobile includes a cover body being formed from one layer of non-woven material which may be made from spunbond-meltblown-spunbond (SMS) fibers. The cover body has a longitudinal direction and a pair of ends. The cover body defines a pair of pockets adapted to receive portions of the seat with the pockets disposed at opposite ends of the cover body.

5 Claims, 6 Drawing Sheets

U.S. PATENT DOCUMENTS

2003/0218367 A1* 11/2003 Parker et al. ............... 297/229
2004/0214489 A1   10/2004 Porter
2005/0225135 A1* 10/2005 Moses ..................... 297/228.1
2007/0092830 A1*  4/2007 Lai et al. ................. 430/270.1

OTHER PUBLICATIONS

PCT Notification of Transmittal of the International Search Report and the Written Opinion of the International Searching Authority, dated Nov. 1, 2007.

* cited by examiner

TEMPORARY PROTECTIVE SEAT COVER

CROSS REFERENCE TO RELATED APPLICATION

This application claims the benefit of U.S. Provisional Patent Application Ser. No. 60/751,756 filed Dec. 19, 2005 and claims the benefit of U.S. Provisional Patent Application Ser. No. 60/810,270 filed Jun. 2, 2006; the disclosures of both are incorporated herein by reference.

BACKGROUND OF THE INVENTION

1. Technical Field

The present invention generally relates to protective covers and, more particularly, to the composition and structure of a temporary protective seat cover used in the automotive industry to protect seats in newly manufactured automobiles.

2. Background Information

U.S. Pat. No. 4,676,376 discloses a protective car seat cover in the form of a co-extruded plastic film. Other prior art seat covers have been fabricated from a clear plastic material. The present invention provides an alternative to the device disclosed in this patent. Such seat covers are used to protect the outer surface of an automobile seat from small abrasions, dirt, and moisture during the time period after the seat is manufactured to the time when the vehicle is delivered to the dealer lot.

Vehicle seat covers must not interfere with any vehicle assembly steps that occur after the seats are installed into the vehicle. Thus, the seat covers must remain securely anchored to the seats while workers slid in and out of the vehicle. The seat covers also must be unobtrusive in order to remain out of the workers' way. Further, the covers must be tough enough to withstand numerous people entering and exiting the vehicle.

Some vehicle manufacturers test each vehicle on the road before the vehicle leaves the manufacturing facility. This process includes an examination of vehicle noises. Testers have complained that existing seat covers interfere with the noise portion of the test because the seat covers generate noise as the tester moves in the seat. These testers thus desire a quiet seat cover that meets or exceeds all other requirements for a vehicle seat cover.

SUMMARY OF THE INVENTION

The invention provides a temporary seat cover for use in the automotive industry. The cover protects the seat material from dirt while also providing desirable grip between the user and the seat while further minimizing the amount of noise generated by any movement of the seat cover.

In one configuration, the invention provides a seat cover formed from a non-woven material. In an exemplary embodiment, the non-woven material is a spunbond-meltblown-spunbond material.

In another configuration, the invention provides a seat cover adapted to removably cover a seat in an automobile. In this configuration, the seat cover includes a cover body being formed from one layer of spunbond-meltblown-spunbond fibers; the one layer of spunbond-meltblown-spunbond fibers having a machine direction; the cover body having a longitudinal direction and a pair of ends; and the cover body defining a pair of pockets adapted to receive portions of the seat; the pockets disposed at opposite ends of the cover body.

In another configuration, the invention provides seat cover adapted to removably cover a seat in an automobile; the seat cover including a body being formed from a non-woven polymer material; the cover body adapted to cover an upper and forward-facing surface of the automobile seat; he non-woven polymer material being a spunbond-meltblown-spunbond polymer material; the material having a standard weight per area of 1.0 oz or greater; the cover body including an upper pocket, a front pocket, and a body sheet; the upper pocket being tapered and adapted to fit over an upper portion of the automobile seat; the upper pocket having a front, a back, a pair of sides, and a lower edge; the front pocket being tapered and adapted to fit over a front portion of the automobile seat; the front pocket having a top, a bottom, a pair of sides, and a rear edge; the body sheet connecting the upper pocket to the lower pocket; the front of the upper pocket defines a pair of sight openings disposed adjacent the sides of the upper pocket; and a rear portion of the top of the front pocket and a forward portion of the body sheet cooperate to define a pair of access openings; the access openings being disposed adjacent the sides of the front pocket.

A further configuration of the invention provides a seat cover adapted to removably cover a seat in an automobile; the seat cover including a cover body being formed from a non-woven polymer material; the cover body adapted to cover an upper and forward-facing surface of the automobile seat; the non-woven polymer material being a spunbond-meltblown-spunbond polymer material; the material having a standard weight per area of 1.0 oz or greater; the cover body including an upper pocket, a front pocket, and a body sheet; the upper pocket adapted to fit over an upper portion of the automobile seat; the upper pocket having a front, a back, a pair of sides, and a lower edge; a front pocket; the front pocket adapted to fit over a front portion of the automobile seat; the front pocket having a top, a bottom, a pair of sides, and a rear edge; the body sheet connecting the upper pocket to the lower pocket; the body sheet defining a pair of spaced slits; the slits being disposed an equal distance from the lower edge of the upper pocket; the upper pocket defining an arm slit in both the front and back of the upper pocket; the arm slit being disposed in a lower portion of the upper pocket; the arm slit being disposed parallel to the lower edge of the upper pocket; the front of the upper pocket defining a tag opening disposed in a central upper portion of the front of the upper pocket; the front of the upper pocket defining a pair of sight openings disposed adjacent the sides of the upper pocket; and a rear portion of the top of the front pocket and a forward portion of the body sheet cooperate to define a pair of access openings; the access openings being disposed adjacent the sides of the front pocket.

BRIEF DESCRIPTION OF THE DRAWINGS

Similar numbers refer to similar parts throughout the specification, even when referencing different configurations of the invention. The drawings are not to scale.

DETAILED DESCRIPTION OF THE INVENTION

Exemplary seat cover configurations are indicated by the numerals 2 and 20 in the accompanying drawings. These covers are designed to temporarily protect the material of the front automobile seats from the time when the seat is manufactured until the time the automobile having the seat is delivered to the automobile dealer lot. The covers are then removed and recycled. In the exemplary configurations, covers 2 and 20 are made solely of spunbond-meltblown-spunbond (SMS) polypropylene. In alternative configurations, covers 2 and 20 may be made from a Spunbond, meltblown, or SMS polyethylene, PET (polyester), Rayon, Nylon or a blend of any of these materials. In other configurations, covers 2 and 20 may be fabricated from a monolayer or multilayer of a non-woven, non-extruded, randomly cast body formed by one or a combination of the forgoing materials. The terms "spunbond" refers to a non-woven fiber or filament material of small diameter fibers that are formed by extruding molten thermoplastic polymer as fibers from a plurality of capillaries of a spinneret. The extruded fibers are cooled while being drawn by an eductive or other well known drawing mechanism. The drawn fibers are deposited or laid onto a forming surface in a generally random manner to form a loosely entangled fiber web, and then the laid fiber web is subjected to a bonding process to impart physical integrity and dimensional stability. The production of spunbond fabrics is disclosed, for example, in U.S. Pat. No. 4,340,563 to Appel et al., U.S. Pat. No. 3,692,618 to Dorschner et al., and U.S. Pat. No. 3,802,817 to Matsuki et al., all incorporated herein by reference in their entireties. Typically, spunbond fibers or filaments have a weight-per-unit-length in excess of about 1 denier and up to about 6 denier or higher, although both finer and heavier spunbond fibers can be produced. In terms of fiber diameter, spunbond fibers often have an average diameter of larger than 7 microns, and more particularly between about 10 and about 25 microns, and up to about 30 microns or more. As used herein the term "meltblown fibers" means fibers or microfibers formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers may be continuous or discontinuous, are often smaller than 10 microns in average diameter and are frequently smaller than 7 or even 5 microns in average diameter, and are generally tacky when deposited onto a collecting surface.

Figure 1:
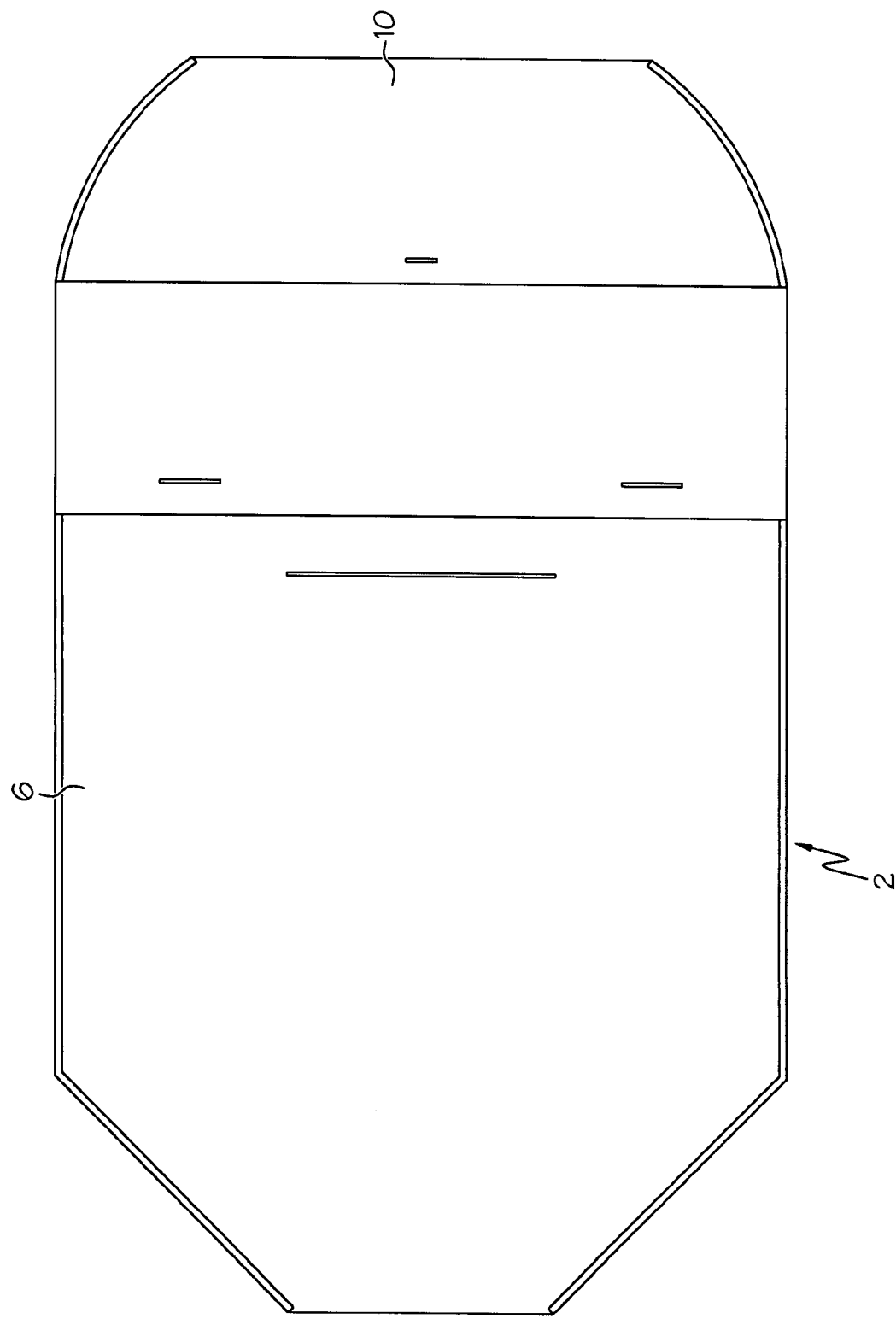
FIG. 1 is a plan view of a first configuration of the seat cover when the cover is disposed flat and not on a seat.
Figure 2A:
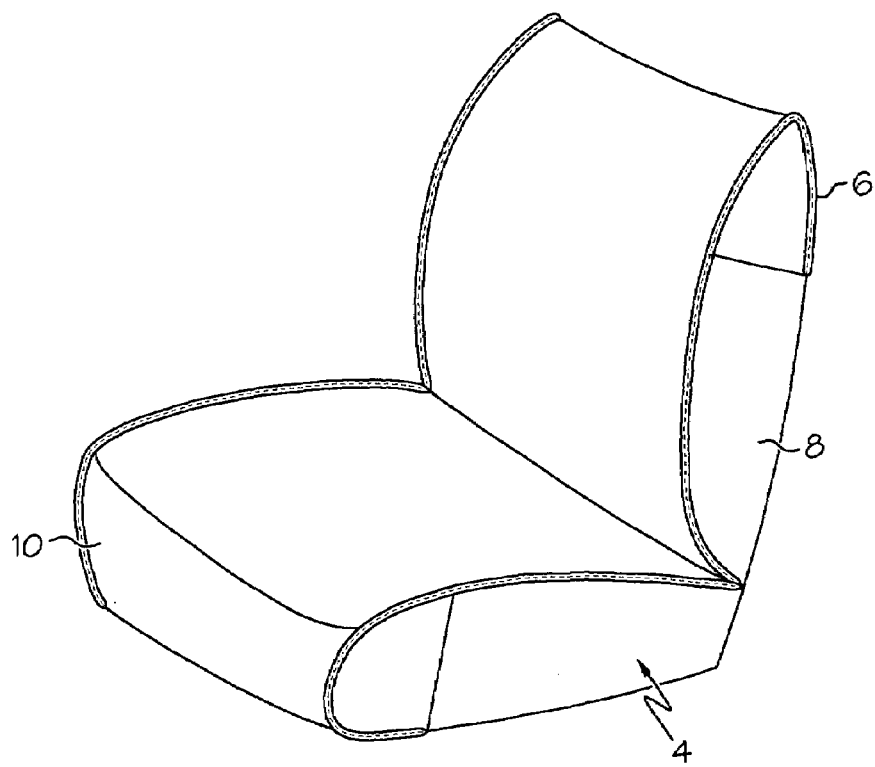
FIG. 2A is a perspective view showing the first configuration of the seat cover attached to a typical automotive seat.
Figure 2B:
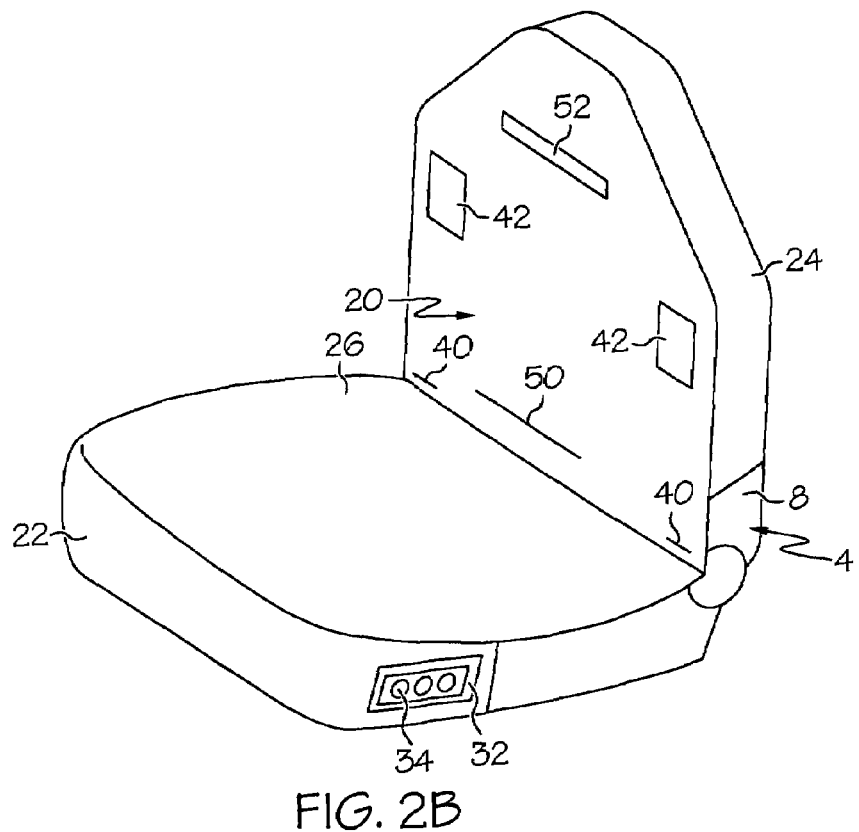
FIG. 2B is a perspective view showing the second configuration of the seat cover attached to a typical automotive seat.

FIGS. 1 and 2 depict a temporary, removable protective cover 2 for an automobile seat 4 or the like which comprises a sewn strip of non-woven material with a pocket or cap 6 at the upper end that fits over the upper end of the seat back 8, with the remaining portion of the fabric extending downwardly over the front surface of seat 4 with or without another pocket 10 at the bottom to secure that portion of cover 2 to seat 4. The cover material is a mono layer, spunbond-meltblown-spunbond (SMS) non-woven fabric formed of thermoplastic materials. In this exemplary configuration, the material is 0.75 oz/yd$^2$ (25.4 g/m$^2$) or 1.0 oz/yd$^2$ (33.9 g/m$^2$) weight material. The surface of the fabric that faces inwardly against the seat exhibits cling so that the cover is not easily slid off the seat. The surface that faces outwardly is slippery enough to not cling against a test driver. The driver thus will not readily remove the cover from the seat when entering and exiting the vehicle. The exemplary configuration of SMS polypropylene fabric has both of these surfaces. A seat cover thus formed clings to the seat and prevents dislodging of the seat cover even though the seat cover may be subjected to a sideways displacement force when a person or other object slides across the exterior surface of the seat cover.

Seat covers 2 and 20 may be folded and stored individually in a convenient dispensing box prior to use, with each cover being individually folded so that it can be easily removed from the box independent of the other covers. In this boxed configuration, a static charge may be generated when one cover is being pulled from the other covers and when the cover is unfolded. This static charge may enhance the cling properties of the cover to the car seat.

Figure 4:
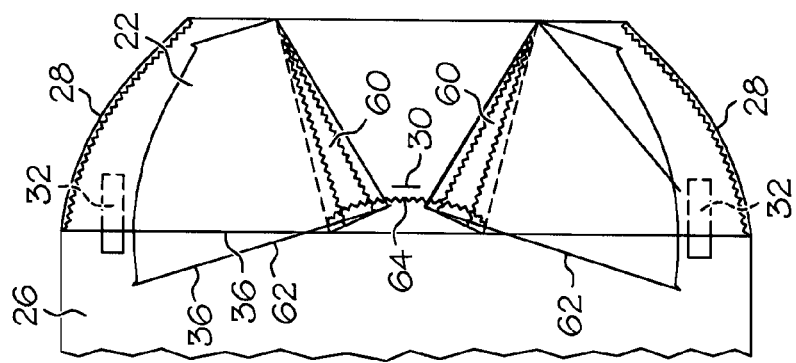
FIG. 4 is a plan view of the front end of the second seat cover configuration in both its unfolded and folded configurations.
Figure 3:
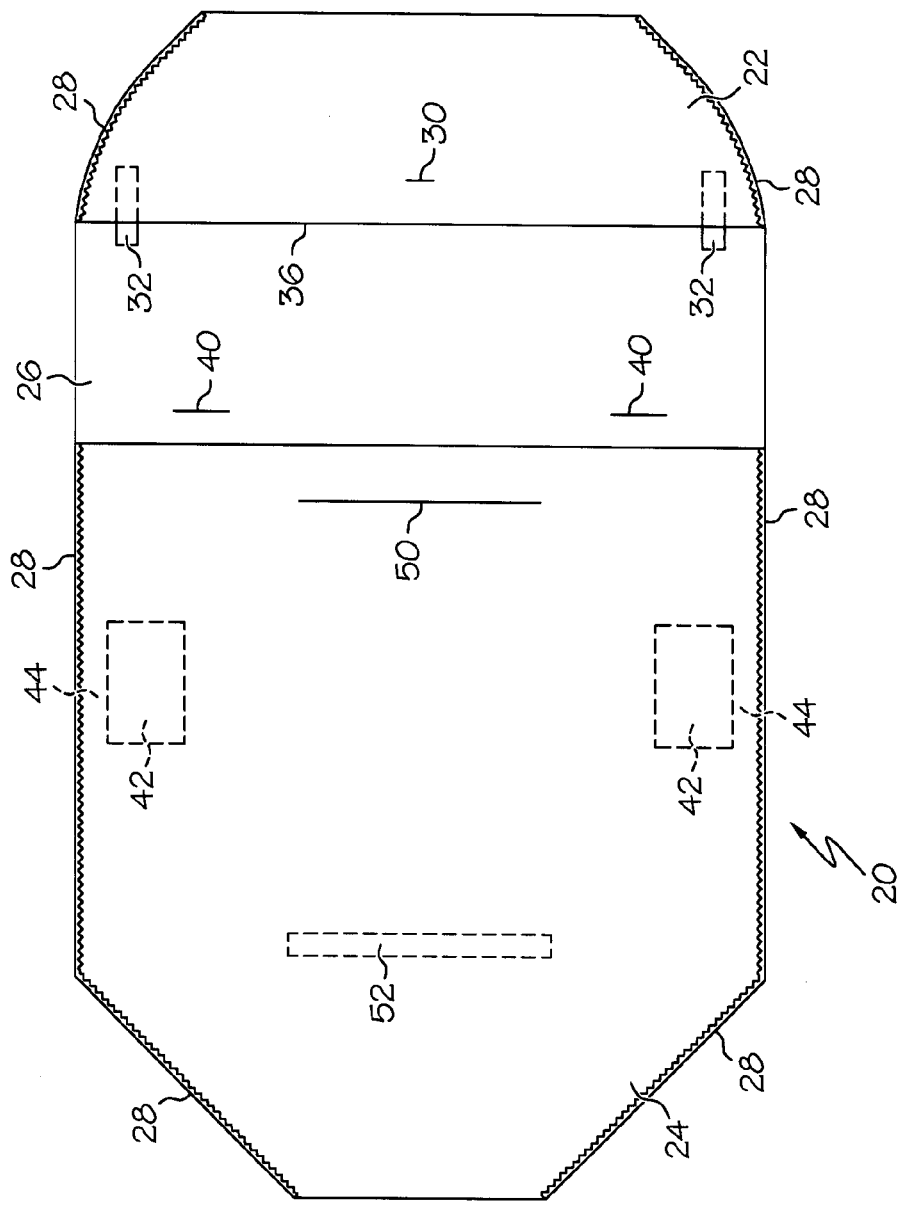
FIG. 3 is a plan view of a second configuration of the seat cover when the cover is disposed flat and not on a seat.

A second exemplary seat cover 20 is depicted in FIGS. 3 and 4. Cover 20 is formed from a single layer of one of the SMS materials described above. In the exemplary embodiment, the side of the material facing the seat may be embossed with a pattern to enhance the coefficient of friction (COF). In this example, the SMS material is a 1.25 oz/yd$^2$ (42.4 g/m$^2$) weight material. The machine direction strength (MD) of this material is higher and thus is disposed along the longitudinal direction of cover 20. Persons sitting down on cover 20 often slide down the lower portion of the seat back and thus tend to pull against cover 20 in the longitudinal direction. Positioning the machine direction of the non-woven material thus strengths cover 20 against this force.

Figure 5:
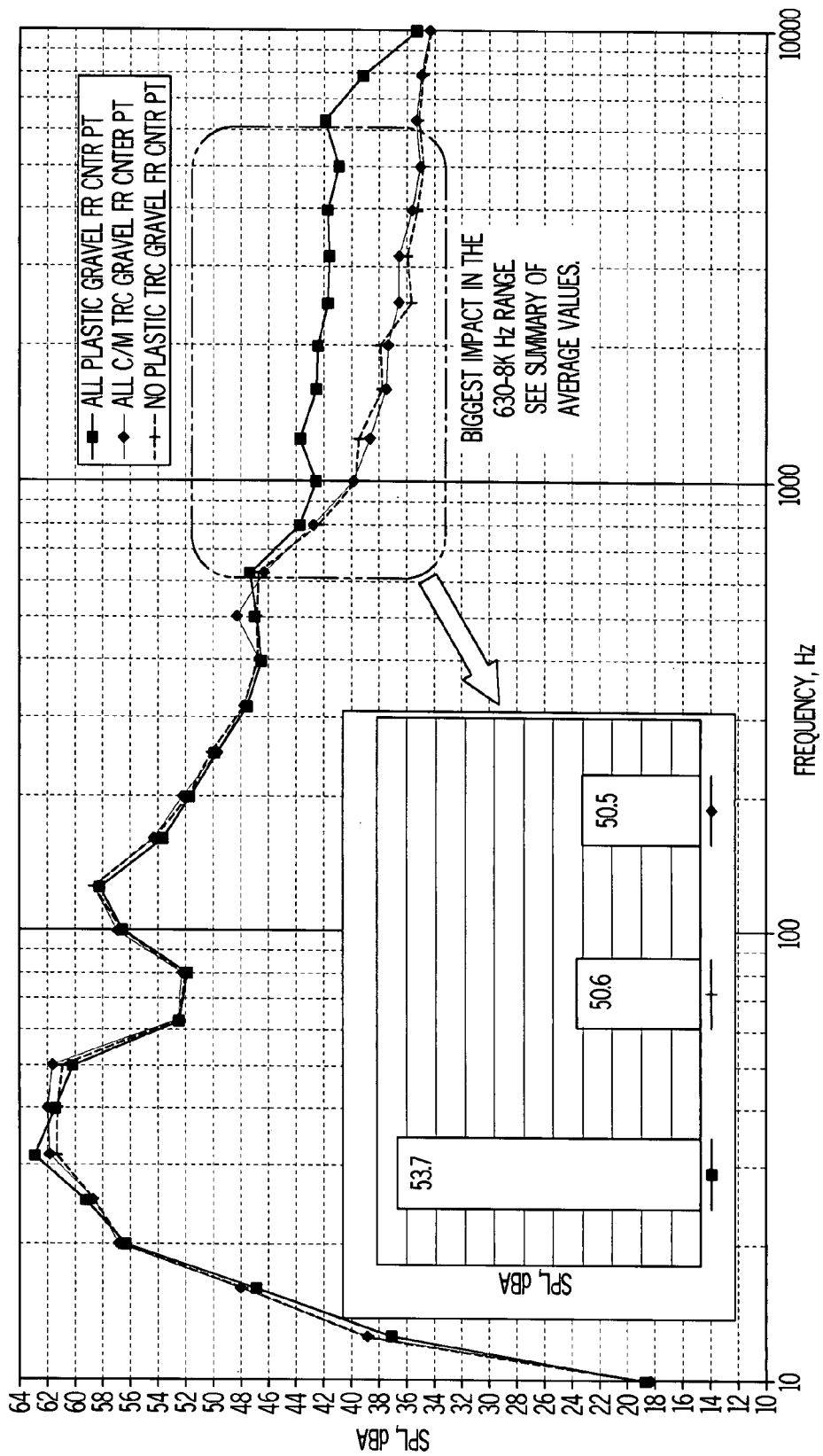
FIG. 5 is a graphic showing gravel road noise test results for the second configuration of the seat cover compared with an uncovered seat and a prior art seat cover.
Figure 6:
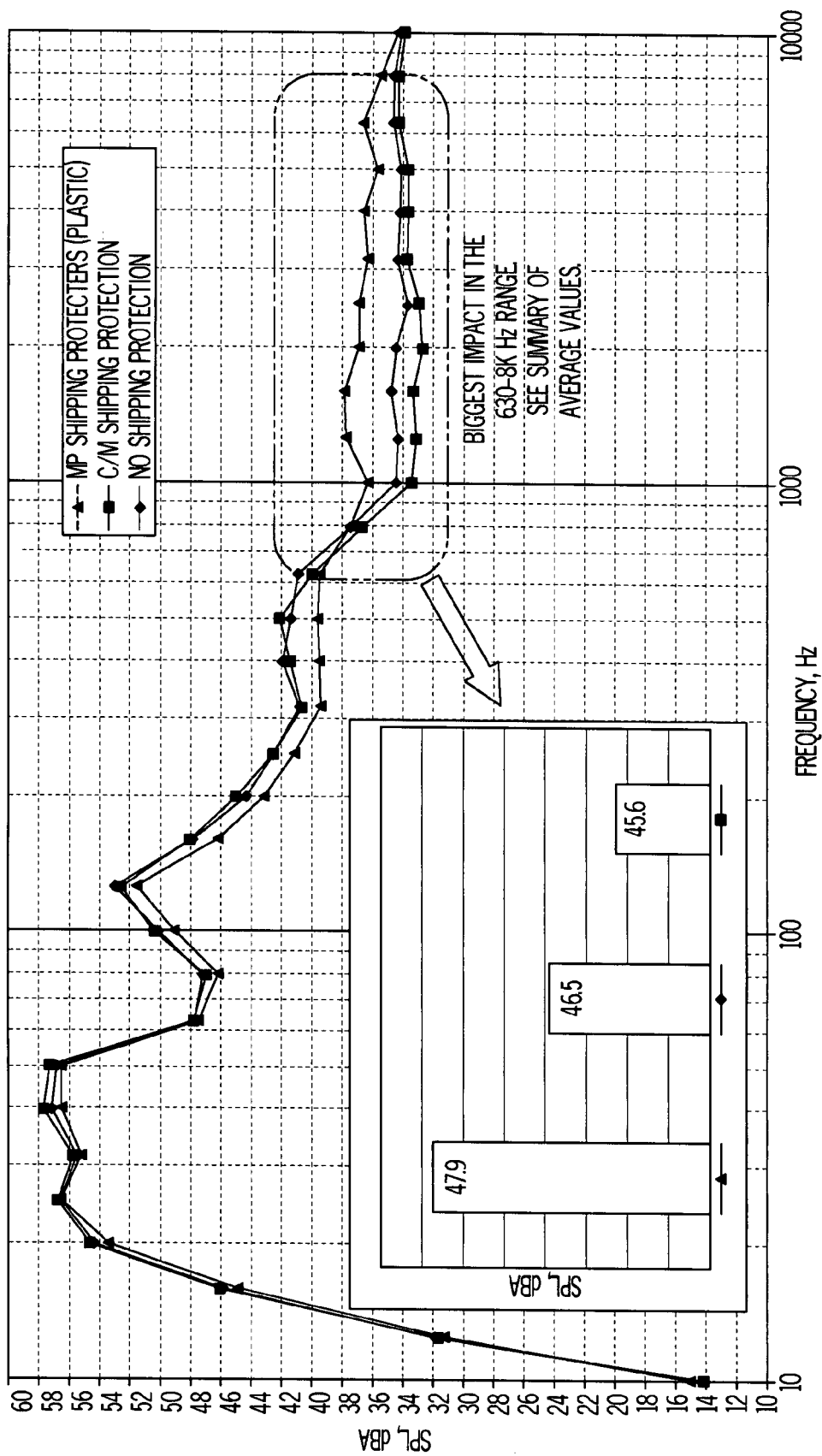
FIG. 6 is a graphic showing service center road noise test results for the second configuration of the seat cover compared with an uncovered seat and a prior art seat cover.

The non-woven materials used to form seat covers 2 and 20 are desirable because they make little noise when moved against a seat or crumbled against themselves. These materials thus do not interfere with the noise test conducted by the test drivers at the manufacturing facility. These test drivers must listen for any unusual squeaking, cracking, popping, knocking, etc. The crackling noise of a prior art plastic sheet seat cover has been undesirable. The non-woven materials described herein eliminate these undesirable noises. FIGS. 5 and 6 depict one sample test showing that the noise performance of the non-woven material matches an uncovered seat while the prior art plastic sheet-style cover adds noise to the tester's environment. SMS materials having at least the following properties are useful for manufacturing cover 20.

MVTR (ASTM D 6701) analyzed on MOCON Permatran—W 101K Water Vapor Permeability Instrument (Test Gas Humidity 100% RH; Carrier Gas=Nitrogen @ 0% RH; 37.8 degrees C.)

Sample 1: 36,670 g/m$^2$-day
Sample 2: 37,060 g/m$^2$-day
AVERAGE VALUE=36,865
Test conditions of 100% RH and 100 F The MVTR is an important aspect of cover 20. Any moisture held by the seat or the seat covering materials is allowed to evaporate without being trapped by seat cover 20.

Light Transmission—82.2%
Haze (ASTM D1003)—89.6%
Clarity (ASTM D1003)—68.3%
Opacity—35.6%
45 degree Gloss (ASTM D 2457)—3.6 Gardner gloss units The light transmission and UV blocking (discussed below with reference to FIG. 7) are important aspects of cover 20 in order to protect the new seat covering materials from sunlight while the new automobile is being delivered to the dealer lot. The low gloss number is desired by those who work around and in the automobiles during the final testing and inspection steps of the manufacturing and delivery process. This number is 5-6 times less than the gloss measurement of an existing plastic cover F—50 Dart Drop (ASTM D1709, A)—70 g Tensile at Break (ASTM D882, 2" jaw separation, 20"/min crosshead speed, 1" wide specimen)
  MD—1.8 MPa
  TD—1.1 MPa
% Elongation at Break (ASTM D882, same as above):
  MD—73%
  TD—83%
Elmendorf Tear (ASTM D1922)
  MD—452 gf
  TD—873 gf The strength properties of cover 20 are important because workers and testers repeatedly enter and exit the automobile. Cover 20 must be durable enough to withstand these repeated entries and exits without tearing and exposing the seat covering material.

COF (ASTM D1894):
  Cloth/Leather—0.225 (kinetic)
  Plastic/Leather—0.20 (kinetic)
  Cloth/Cloth—0.455 (kinetic)
  Plastic/Cloth—0.19 (kinetic)

The exemplary plastic measurements here provide a comparison between an existing plastic seat cover and the SMS material. The COF of the SMS against the leather is as good as the existing plastic.

Seat covers manufactured from a non-woven material have a soft feel and are fabric-like in that they produce very little audible noise when someone is sitting on the cover with the cover disposed on a car seat, even if the person is moving around. The graphs of FIGS. 5 and 6 depict a decibel test showing how the non-woven seat cover of the invention compares to the prior art seat covers. In this test, the microphone was positioned between two covered seats as depicted in the schematic at the upper right hand corner of the drawing figure. This microphone measured all the noise present at this location while the vehicle was driven over a test road (gravel road in FIG. 5 and a service road in FIG. 6). In these test environments, the prior art plastic seat cover produced measurably more noise as shown by the upper line (identified with the triangles) in the graphs. The non-woven seat cover produced essentially the same noise as an uncovered seat as shown by the two lower lines (identified with the squares and diamonds). In FIG. 6, the non-woven cover may have dampened some of the sound normally created between the driver and the seat.

Cover 20 is formed by folding the material back on itself twice to form a tapered upper pocket 24 and a tapered front pocket 22 with a body sheet 26 connecting pockets 22 and 24 together. The sides are stitched 28 to form pockets 22 and 24. The particular dimensions of these elements and the elements described below depend on the particular size and shape of the seat on which cover 20 will be used.

The body of cover 20 defines a hook slit 30 adapted to allow a hook under the seat to pass through the body of cover 20 to help retain the front of cover 20 on seat 4. The front of the body of seat cover 20 also defines a pair of elongated access openings 32 laterally spaced from hook slit 30. Openings 32 are positioned at the sides of seat 4 when cover 20 is installed. Openings 32 allow a worker or a user to access the seat controls 34 disposed on the side of seat 2. Openings 32 are particularly useful during the seat installation process when a worker uses a tool to activate the seat retraction controller while installing the seat on the vehicle. When prior art covers would cover controls 34, the worker would remove a portion of the prior art cover to access the controls. The seat would then remain uncovered or the cover would be damaged when the worker pulled on the cover to access controls 34. Cover 20 provides openings 32 on both sides of cover to allow cover 20 to be used on either the driver's side or the passenger's side of the vehicle. Openings 32 may be positioned with respect to pocket 22 so that the rear edge 36 of pocket 22 is aligned with openings 32.

Body sheet 26 defines a pair of slits 40 that allow the seat belts of the vehicle to be used. Slits 40 are spaced apart and are disposed closer to the sides of cover 20 than they are to each other. Slits 40 are disposed an equal distance from the lower edge of upper pocket The front of upper pocket 24 of cover 20 defines a pair of sight openings 42 disposed adjacent the sides 44 of upper pocket 24. Openings 42 are configured to allow the color and material of seat 4 to be directly viewed by a worker checking the assembly of the vehicle. The worker uses these openings 42 to compare the color of seat 4 with the color of the other portions of the vehicle in which seat 4 is being (or has been) installed. Other seat covers did not have such openings and required the user to look at the color through the material from which the prior art seat cover was fabricated. Openings 42 have been located at locations for convenient viewing while also being in locations less prone to damage or wear.

The body of cover further defines an arm slit 50 that allows a loading arm to help the worker lift seat 4 during installation. Arm slit 50 may pass through both layers (the front and back) of material that define upper pocket 24. The arm slit is disposed close to the lower edge of upper pocket so that it is aligned with the juncture of the seat back with the seat base when cover 20 is installed. The body also defines a tag opening 52 that allows the seat tags to be pulled through cover 20.

FIG. 4 depicts the collapsed and assembled configurations of pocket 22. The assembled condition has the darts 60 folded and stitched to form a tighter pocket 22. This type of pocket helps keep cover 20 out of the way when seat 4 is being installed. In another configuration, darts 60 are not used to form the pocket configuration. The body is formed to have the geometry of pocket 22 shown in FIG. 4 without darts 60. The geometry has a pair of angled shoulders 62 that extend in from the sides to a flat middle portion 64. This geometry of the front pocket helps keep cover 20 secured to seat 4 while also keeping cover 20 out of the way of the workers installing seats 4.

The cover will "grip" the seat due to the natural surface roughness of the non-woven to prevent the cover from sliding out of place when in use. The cover will adequately not stick or cling to the person sitting on it as they slide sideways across the cover when getting in and out of the car so that it remains in the intended position on the seat so that it protects the seat. The cover is breathable to allow air to pass through the cover naturally. The cover can be tailored for multiple seat geometries, applications and designs to be "Form Fitting". The cover is designed to be easy to install and uninstall The cover is inherently hydrophobic so as to repel small amounts of liquid or dirt that come into contact with it while still maintaining it's breathability. The unit weight per cover is lighter due the total mass and specific gravity are both less than that of the prior art. The cover may be mostly-opaque and provided in a light color (white, tan, blue) for low heat absorption from the sun through the windows on a sunny day. The cover and seat thus remain cool when the cover is used. An advantage with a white or light-colored cover is that a worker can immediately identify foreign material disposed on the cover.

The cover can be sewn to create stronger seams less prone to tearing during use that might cause the cover to fail to protect the seat. The cover being made from SMS is less prone to tearing during normal use than that of the prior art. The cover may be coated and/or embossed to add differential coefficient of friction (COF) properties as required and still be of monolayer construction. The SMS cover has desirable UV blocking properties compared with existing seat covers. The SMS cover may be completely recycled. In addition, personnel at the dealer lot may use the seat cover as a cleaning cloth to wipe down areas of the vehicle before the seat cover is recycled. A further advantage of this cover is that the material may be printed. This allows information about the seat to be printed directly on the seat cover in machine readable format (such as a bar code) and in a format readable by workers.

Figure 7:
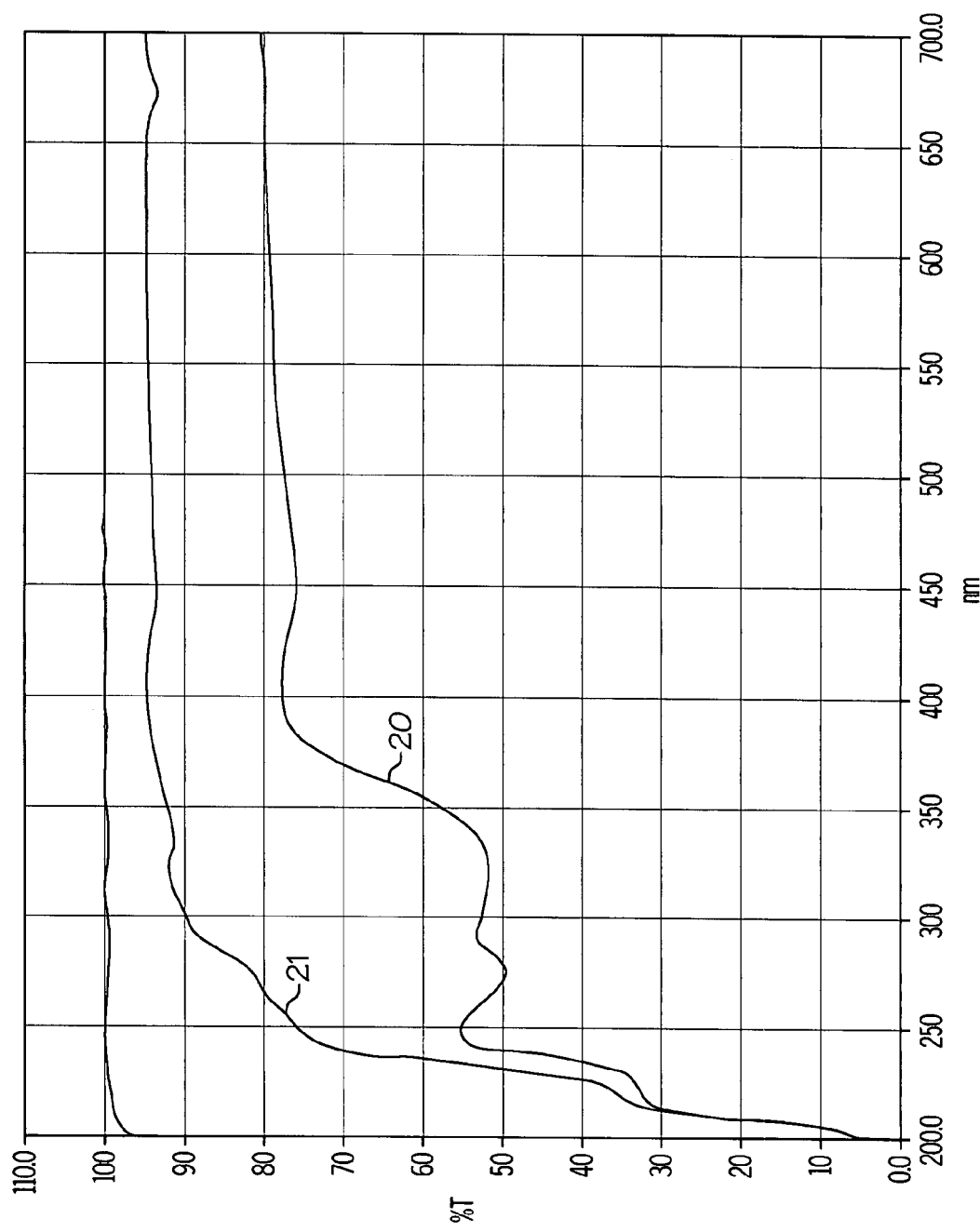
FIG. 7 is a graphic showing a comparison of UV radiation transmission for an exemplary material and the prior art material.

FIG. 7 depicts a comparison of a 1 oz material similar to the 1.25 oz material described above with reference to seat cover 20 and a prior art clear plastic cover 21. The material used to form seat cover 20 shows a significantly better ability to block UV radiation above 225 nm and particularly the UVA band radiation in the 315-415 nm wavelength range where the material has less than 80 percent transmittance and under 60 percent transmittance under 350 nm. The 1.25 oz material is expected to have UV blocking properties that are even better than those depicted in FIG. 7. The UV blocking properties of this material are desired by the automobile manufacturers in order to protect new seat covers while the new automobiles are being delivered to dealer lots.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A seat cover adapted to removably cover a seat in an automobile; the seat cover comprising:
   a monolayer cover body consisting of a non-woven polymer fabric material; the non-woven polymer fabric material having a machine direction;
   the monolayer cover body being permeable to moisture vapor;
   the material having a standard weight per area of 1.0 oz per sq. yd or greater;
   the cover body defining an upper pocket, a front pocket, and a body sheet;
   the upper pocket adapted to fit over an upper portion of the automobile seat; the upper pocket having a front, a back, a pair of sides, and a lower edge;
   the front pocket adapted to fit over a front portion of the automobile seat; the front pocket having a top, a bottom, a pair of sides, and a rear edge;
   the body sheet connecting the upper pocket to the lower pocket;
   the body sheet defining a pair of spaced slits; the slits being disposed an equal distance from and parallel to the lower edge of the upper pocket;
   the upper pocket defining an arm slit in at least the back of the upper pocket; the arm slit being disposed in a lower portion of the upper pocket; the arm slit being disposed parallel to the lower edge of the upper pocket;
   the front of the upper pocket defining a tag opening disposed in a central upper portion of the front of the upper pocket; the tag opening being independent and spaced from the arm slit; the arm slit being disposed intermediate the location of the tag opening and the lower edge of the upper pocket;
   the front of the upper pocket defining a pair of sight openings disposed adjacent the sides of the upper pocket; each of the sight openings being spaced from the lower edge of the upper pocket; each of the sight openings being disposed intermediate the location of the arm slit and the tag opening; and
   a rear portion of the top of the front pocket and a forward portion of the body sheet cooperate to define a pair of access openings; the access openings being disposed adjacent the sides of the front pocket.

2. The seat cover of claim 1, wherein the pockets are tapered.

3. A seat cover adapted to removably cover a seat in an automobile; the seat cover comprising:
   a monolayer cover body consisting of a non-woven polymer fabric material; the non-woven polymer fabric material having a machine direction;
   the monolayer cover body being permeable to moisture vapor;
   the cover body defining an upper pocket, a front pocket, and a body sheet;
   the upper pocket adapted to fit over an upper portion of the automobile seat; the upper pocket having a front, a back, a pair of sides, and a lower edge;
   the front pocket adapted to fit over a front portion of the automobile seat; the front pocket having a top, a bottom, and a rear edge;
   the body sheet connecting the upper pocket to the lower pocket;
   the body sheet defining a pair of spaced slits; the slits being disposed an equal distance from and parallel to the lower edge of the upper pocket;
   the upper pocket defining an arm slit in at least the back of the upper pocket; the arm slit being disposed in a lower portion of the upper pocket; the arm slit being disposed parallel to the lower edge of the upper pocket;
   the front of the upper pocket defining a tag opening disposed in a central upper portion of the front of the upper pocket; the tag opening being independent and spaced from the arm slit; the arm slit being disposed intermediate the location of the tag opening and the lower edge of the upper pocket;
   the front of the upper pocket defining a pair of spaced-apart sight openings disposed adjacent the sides of the upper pocket; each of the sight openings being spaced from the lower edge of the upper pocket; each of the sight openings being disposed intermediate the location of the arm slit and the tag opening; and
   the front pocket being tapered with the bottom of the front pocket having a pair of darts.

4. The seat cover of claim 3, wherein the bottom of the front pocket defines a hook slit disposed parallel to the rear edge of the front pocket; the hook slit being disposed between the darts.

5. The seat cover of claim 4, wherein a rear portion of the top of the front pocket and a forward portion of the body sheet cooperate to define a pair of access openings; the access openings being disposed adjacent the sides of the front pocket.

* * * * *